United States Patent
Khare

(10) Patent No.: US 10,735,190 B1
(45) Date of Patent: Aug. 4, 2020

(54) PERSISTENT TPM-BASED IDENTIFIER AND KEY PAIR

(71) Applicant: Amazon Technologies, Inc., Seattle, WA (US)

(72) Inventor: Atul Khare, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 261 days.

(21) Appl. No.: 15/815,665

(22) Filed: Nov. 16, 2017

(51) Int. Cl.
| | |
|---|---|
| *G06F 21/57* | (2013.01) |
| *G06F 21/60* | (2013.01) |
| *H04L 9/08* | (2006.01) |
| *H04L 9/32* | (2006.01) |

(52) U.S. Cl.
CPC .......... *H04L 9/0877* (2013.01); *G06F 21/575* (2013.01); *G06F 21/602* (2013.01); *H04L 9/0897* (2013.01); *H04L 9/321* (2013.01); *H04L 9/3234* (2013.01); *H04L 9/3263* (2013.01); *H04L 2209/127* (2013.01)

(58) Field of Classification Search
CPC ..... H04L 9/0877; H04L 9/3263; H04L 9/321; H04L 9/0897; H04L 9/3234; H04L 2209/127; G06F 21/602; G06F 21/575
USPC ......................................................... 713/193
See application file for complete search history.

(56) References Cited

U.S. PATENT DOCUMENTS

| | | | |
|---|---|---|---|
| 7,725,703 B2 | 5/2010 | Hunter et al. | |
| 2005/0257073 A1 | 11/2005 | Bade et al. | |
| 2006/0015717 A1 | 1/2006 | Liu et al. | |
| 2007/0226496 A1* | 9/2007 | Maletsky | ................ G06F 21/32 713/168 |
| 2009/0323967 A1* | 12/2009 | Peirce | .................. H04L 9/0869 380/278 |
| 2017/0206174 A1* | 7/2017 | Keranen | ............... H04L 9/3226 |

OTHER PUBLICATIONS

Trusted Computing Group, "TCG Infrastructure Working Group A CMC Profile for AIK Certificate Enrollment", TCG Published, Copyright 2006-2011, Version 1.0, Mar. 24, 2011, pp. 1-72.
Trusted Computing Group, "TCG Infrastructure WG CMC Profile for EK/Platform Certificate Enrollment for TPMv1.2", TCG Published, Copyrigt 2013, Specification Version 1.0, Apr. 3, 2013, pp. 1-46.

(Continued)

*Primary Examiner* — Mohammad W Reza
(74) *Attorney, Agent, or Firm* — Robert C. Kowert; Kowert, Hood, Munyon, Rankin & Goetzel, P.C.

(57) ABSTRACT

Systems and methods are disclosed to generate a persistent identifier for a device using a trusted platform module (TPM) of the device, so that the identifier is persistent during the lifetime of the TPM. In embodiments, during an initialization of the TPM, the system obtains an entropy value from the TPM used to generate the device's persistent identifier. The identifier is written to a non-volatile storage of the TPM so that it cannot be erased during the lifetime of the TPM. In embodiments, a persistent keys pair is generated based on the identifier, and also permanently written to the non-volatile storage. In embodiments, the persistent identifier may be measured and verified via TPM quotes. In embodiments, the persistent private key may be used to sign a nonce to prove the identity of the device.

20 Claims, 9 Drawing Sheets

(56) References Cited

OTHER PUBLICATIONS

Trusted Computing Group, "Attestation Identity Key (AIK) Certificate Enrollment Specification Frequently Asked Questions Sep. 2011", pp. 1-2.
Trusted Computing Group, "TPM Main Part 1 Design Principles", Specification Version 1.2, Revision 116, TCG Published, Copyright 2003-2011, Mar. 1, 2011, pp. 1-184.
Trusted Computing Group, "TPM Main Part 2 TPM Structures", Specification Version 1.2, Level 2 Revision 116, TCG Published, Copyright 2003-2011, Mar. 1, 2011, pp. 1-201.
Trusted Computing Group, "TPM Main Part 3 Commands", Specification Version 1.2, Level 2Revision 116, TCG Published, Copyright 2003-2011, pp. 1-339.

* cited by examiner

PERSISTENT TPM-BASED IDENTIFIER AND KEY PAIR

BACKGROUND

Many companies and other organizations operate computer networks that interconnect computing systems to support their operations. In particular, public data centers housing significant numbers of interconnected computing systems have become commonplace. As these public data centers emerge in the marketplace, use of various hardware security systems such as trusted platform modules or TPMs have also gained more prominence. TPMs, in particular, are designed provide trusted information about a piece of computer hardware (e.g., via a TPM quote) which may be used to verify the hardware before it is used.

However, it is notoriously difficult to establish a persistent one-to-one mapping between an identifier and the TPM. The reason for making the mapping difficult is privacy concerns and this means that it is generally impossible to use manufacturer provisioned unique secrets like the Endorsement Key (EK) for this purpose. The suggested workaround is to use yet another user generated identifier called the Attestation Identity Key (AIK). The AIK is certified using the EK, and can then be used as an identity proxy for the EK. However, the AIK is not a persistent identifier because it is tied to the impermanent TPM Storage Root Key (SRK), which can be reset using the TPM reset operation. For example, resetting the TPM will result in the generation of a new SRK, which effectively destroys all derived keys, including the AIK. Furthermore, since the EK is limited to decryption only, it cannot be used as a signing key of the TPM. The lack of a usable persistent identifier for the TPM and a set of persistent keys for the TPM make TPM-based device more difficult to use and less trustworthy.

Figure 1:
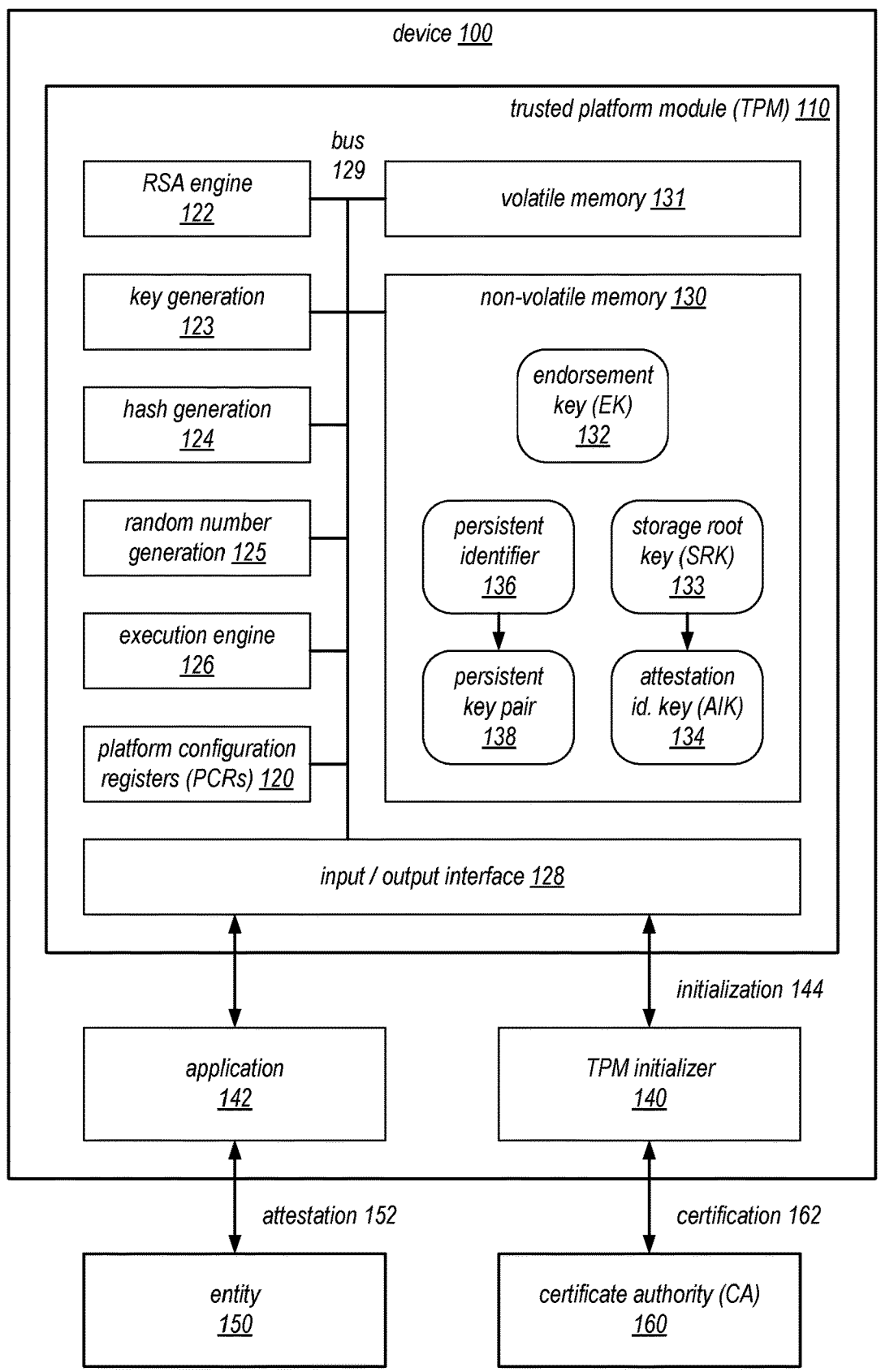
FIG. 1 is a block diagram illustrating an example device that generates a persistent identifier and key pair using a TPM, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

The systems and methods described herein may be employed in various combinations and in embodiments to implement a device that generates and stores a persistent identifier and key pair using a trusted platform module (TPM). Combinations of the components and techniques described herein improve the functioning of TPM-based systems as described below.

Use of TPMs in computer systems are becoming more common. A TPM is a security module that is coupled to a piece of computer hardware (e.g., a motherboard, a peripheral component, etc.), and may be used to perform certain security functions for the computer system. For example, the TPM may provide trusted information about the computer hardware (e.g., via a TPM quote), which may be used to programmatically verify the identity and configuration of the hardware before it is used. Some of the functionality of the TPM may be defined in standards, such as standards disseminated by the standardization body Trusted Computing Group (TCG).

However, it is notoriously difficult to establish a persistent one-to-one mapping between an identifier and the TPM. That is, identifiers and keys associated with the TPM do not necessarily stay tied to the TPM for the lifetime of the TPM. The reason for making the mapping difficult is privacy concerns. In particular, the manufacturer provisioned Endorsement Key (EK) of the TPM can only be used for decryption, and not a signing key. The is restriction prevents the other parties from associating the EK (and thus the precise TPM device) with the platform system. In general, TPM-based systems use yet another user generated identifier called the Attestation Identity Key (AIK) as a signing key. The AIK is certified using the EK, and can then be used as an identity proxy for the EK. However, the AIK is not a persistent identifier because it is tied to the impermanent TPM Storage Root Key (SRK), which can be reset using the TPM reset operation. The resetting the TPM will result in the generation of a new SRK, which effectively destroys all derived keys, including the AIK. Furthermore, because the EK is limited to decryption only, it cannot be used as a signing key.

Accordingly, systems and methods are disclosed to generate a persistent identifier for a device using a trusted platform module (TPM) of the system, so that the identifier persists throughout the lifetime of the TPM. In particular, the persistent identifier is not altered or erased via a reset of the TPM. In embodiments, during an initialization of the TPM, the system derives the system's persistent identifier from an entropy value obtained from the TPM. The identifier is stored in a non-volatile storage of the TPM, in a manner so that it cannot be erased even after a reset of the TPM. In embodiments, a persistent keys pair is generated from the identifier, and also persistently stored in the non-volatile storage in the same manner. In embodiments, the persistent identifier is extended into the platform configuration registers (PCRs) of the TPM, and may be verified via TPM quotes. In embodiments, the persistent private key may be used to sign a nonce to prove the identity of the device. These and other features and benefits of the TPM-based persistent identifier and key pair creation system are described in further detail below, in connection with the figures.

FIG. 1 is a block diagram illustrating an example device that generates a persistent identifier and key pair using a TPM, according to some embodiments. The figure depicts an embodiment of a device 100 that includes a trust platform module (TPM) 110. The device 100 may comprise a variety of computer devices, such as for example a computer, a mobile computer, a smart phone, a peripheral device such as a daughter card or a dongle, which may implement different functionality in hardware such as a data storage or network communications, among other things.

The TPM 110 may be a security device that is coupled to the device 100. In some embodiments, when enabled, the TPM 110 may provide a set of security functions for the device to make the device into a "trusted platform." For example, in some embodiments, the TPM 110 may implement a set of security functions that provide some degree of assurance to other entities interacting with the trusted platform that the trusted platform is indeed what it purports to be, and that the trusted platform will behave in the way that the entity expects it to. In some embodiments, the TPM 110 may provide security features such as protected capabilities, integrity measurement, and integrity reporting. In some embodiments, the TPM 110 may also provide features such as confidentiality and integrity protection, secure storage, and process isolation. In some embodiments, some of the functionality of the TPM may be defined in standards, such as standards disseminated by the standardization body Trusted Computing Group (TCG).

Depending on the embodiment, the TPM 110 may include a number of different components. As shown, the TPM 100 may implement an input/output interface 128, which may implement a serialization transformation function that allows incoming data to be transported to a bus (e.g., bus 129) or other type of interconnect connecting components within the TPM. In some embodiments, the I/O interface 128 may also manage information flow between components within the TPM and an external bus connecting the TPM to the device 100. In some embodiments, the I/O interface may be configured to control access to the various TPM components. Access to the components may be configured via an opt-in module on the TPM 110.

As shown, in some embodiments, the TPM 110 may include an execution engine 126, which may be configured to run program code stored in the TPM. In some embodiment, the execution engine 126 may be configured to respond to external commands by selecting appropriate program code to execute. In some embodiments, the program code may be stored as firmware within the TPM 110. In some embodiments, the program code may be used to initialize the TPM 110. In some embodiments, at least some of the initialization functionality may be implemented in other firmware such as the BIOS boot block.

As shown, in some embodiments, the TPM 110 may include a random number generator 125. In some embodiments, the random number generator 125 may provide a source of entropy to components within the TPM 110 or other entities. In some embodiments, the random number generator 125 may generate a random set of bits in a non-deterministic manner. In some embodiments, the random numbers generated by the random number generator 125 may be used to generate cryptographic keys, nonces, and other random data.

As shown, in some embodiments, the TPM 110 may include a hash generator 124. In some embodiments, the hash generator 124 may implement an algorithm to hash input data to produce a fixed length digest. In some embodiments, the algorithm may be a version of the Secure Hash Algorithm SHA-1. The hash generator 124 may be used in a number of functions performed by the TPM 110, for example in the computation of digital signatures and for creating key objects where a hash of the key may be required as part of an integrity protection mechanism.

As shown, in some embodiments, the TPM 110 may include a key generator 123. In some embodiments, because the generation of cryptographic key may be computationally intensive, the TPM 110 may implement a dedicated module to perform this task. For example, the TCG standard specifies that the TPM should include a key generation module that supports keys of a 2048-bit modulus. In some embodiments, some keys may be allowed to have a smaller modulus, depending on their use.

As shown, in some embodiments, the TPM 110 may include an RSA engine 122. The execution of the Rivest-Shamir-Adleman (RSA) algorithm in a computationally complex task, and so in some embodiments, a dedicated module may be provided for the execution of the algorithm itself. The RSA algorithm is used for signing, encryption, and decryption operations using public-private key pairs. In some embodiments, the TPM 110 may maintain the principle of key separation. In some embodiments, the TPM may use dedicated signing keys for signing data, and separate storage key pairs for encryption and decryption.

As shown, in some embodiments, the TPM 110 may include set of platform configuration registers (PCRs) 120. In some embodiments, the PCRs may be used to store integrity metrics of the device 100, as measured by the TPM 110. The integrity metrics stored in the PCRs 120 measure the integrity of any code, from BIOS to applications. In some embodiments, the measurements may be performed before the code is executed. PCRs may be implemented in volatile or non-volatile storage. However, the PCRs 120 are reset when the device 100 loses power or re-starts. In some embodiments, the TPM 110 may have 16 or more PCRs 120 that each store 20 bytes. In some embodiments, PCR registers 0 to 7 are reserved for exclusive use by the TPM 110, and the remaining registers are free for use by the operating system and other applications.

As shown, in some embodiments, the TPM 110 may include volatile memory 131. As discussed in some embodiments, the volatile memory 131 may be used to store the PCRs 120. In some embodiments, the volatile memory 131 may be used to store other dynamic data items, such as for example intermediate values computed by other components of the TPM 110.

As shown, in some embodiments, the TPM 110 may include a non-volatile memory 130. In some embodiments, the non-volatile memory 130 may be used to implement a secure data store resident on the TPM 110, which may be used to long-term store data persistent across reboots of the device 100. In some embodiments, the non-volatile memory 130 may be implemented using non-volatile random access memory (NVRAM).

As shown, in some embodiments, the non-volatile memory 130 may store an endorsement key (EK) 132 for the TPM 110. The EK 132 may be a manufacturer-supplied key that uniquely identifies the TPM. In some embodiments, the EK 132 cannot be reset with the reset operation of the TPM 110, which resets the TPM to its factory default settings. However, the EK 132 cannot be used to sign data. That is, the private key of the EK pair is never used to generate signatures. The public key of the EK pair is only used for encrypting data sent to the TPM during the process of taking ownership and the process of creating AIK certificates. This restriction of the EK 132 exists in part for privacy reasons, so as to prevent third parties from tying a unique TPM to the trusted platform. However, this restriction also means that the EK 132 is not generally used to verify the identity of the TPM 110.

As shown, in some embodiments, the non-volatile memory 130 may store a storage root key (SRK) 133 for the TPM 110. The SRK 133 is not supplied by the TPM's manufacturer, but created during the process of taking ownership of the TPM 110. The SRK 133 forms the root of a key hierarchy used to provide secure storage and, as with the EK 132, never leaves the TPM 110. The key hierarchy allows keys to be encrypted by its parent key(s), so that they can only be decrypted by accessing the TPM 110. Thus, any encryption of data using a key managed by the TPM may be referred to as a binding operation. In some embodiments, the TPM's hierarchy of keys may be stored in encrypted form in storage outside of the TPM. As may be understood, because the SRK 133 is created during the ownership taking process of the TPM, it can be recreated, for example via a second ownership taking or a reset operation of the TPM 110. When this occurs, the entire key hierarchy under the SRK 133 is also lost. Thus, the SRK 133 and any keys created under it are not persistent keys that last throughout the operating lifetime of the TPM device 110. Such keys are data cannot be used to create a persistent identifier or keys that will last throughout the entire operating lifetime of the TPM device.

In some embodiments, the first time that a user takes ownership of a TPM device (e.g., TPM 100), the ownership taking process establishes a shared secret or owner authorization data, and stores this secret in the secure storage (e.g., non-volatile memory 130) of the TPM. The owner authorization data act as a password that allows the owner to prove ownership of the TPM. Once owned, the TPM 110 may require proof of ownership to access certain protected operations of the TPM. It is during the ownership taking process that the EK 132 is used, since the EK 132 is at that time the only key available to the on-owned TPM. The process of ownership is completed with the creation of the SRK 133.

In some embodiments, as shown, the ownership taking process may be performed by a TPM initializer 140. In some embodiments, the TPM initializer may be implemented as a programmed module on the device 100. The behavior of the TPM initializer 140 may be controlled in code, which may be loaded to a storage area on the device 100. In some embodiments, the storage area may be a non-volatile storage such as erasable programmable read-only memory (EPROM) or electrically erasable programmable read-only memory (EEPROM). In some embodiments, the TPM initializer 140 may be invoked during a secure boot sequence, where the TPM is used to measure operating states during the booting of the device 100. In some embodiments, the TPM initializer may perform an initialization process 144, which performs the ownership taking process, and also additional operations to establish other persistent data that are tied to the lifetime of the TPM 110. As shown, such persistent data may include for example a persistent identifier 136 and a persistent key pair 138.

In some embodiments, the persistent identifier 136 and a persistent key pair 138 may be created after the ownership taking process of the TPM 110. In some embodiments, the TPM 110 may expose an interface (e.g., a set of write commands) that allow clients to write the non-volatile memory 130 of the TPM 110. In some embodiments, such writes may be performed so that the data written persistent not only across multiple reboots, but also reset operations that reset the non-volatile configurations of the TPM, for example settings that were established during the ownership taking process. By writing the data in such a manner, the client can create a set of persistent data on the TPM that cannot be modified or erased via a reset operation of the TPM. Thus, such data will persist during the subsequent lifetime of the TPM 110.

In some embodiments, the TPM initializer 140 may first create an entropy value. In some embodiments, the entropy value may be a random or pseudorandom number created via the random number generator 125 on the TPM 110. In some embodiments, entropy value may be used as a persistent identifier 136. In some embodiments, the persistent identifier 136 may be generated from the entropy value. In some embodiments, the persistent key pair 138 may then be derived from the persistent identifier 136. In some embodiments, the persistent key pair 138 may be generated via the key generator 123. The persistent key pair 138 may include a persistent public key, which may be provided to other entities in a certificate, and a persistent private key, which may be stored on the TPM 110 and never leave the TPM. In some embodiments, these pieces of persistent data are written to different indexed locations in the non-volatile memory 130, in a manner so that they cannot be modified or erased during the lifetime of the TPM 110.

In some embodiments, the device 100 may establish an attestation identity key (AIK) 134 for the TPM 110. The AIK 134 may be established via the TPM initializer 140, or some other component on the device 100. In some embodiments, the AIK 134 may be established as part of the initialization process 144, along with the persistent identifier 136 and persistent key pair 138. In some embodiments, the AIK 134 may be a public private key pair generated via the key generator 123 on the TPM 110. The AIK 134 may be regarded as an alias for the EK 132. In some embodiments, there may be multiple AIKs 134 established for the TPM 110. In some embodiments, the AIKs 134 may be stored in encrypted form in a secure storage external to the TPM 110, and can be loaded when they are used.

In some embodiments, the AIK credential may comprise a certificate containing the AIK public key which can be used to prove that the corresponding AIK private key is bound to the TPM 110. In some embodiments, to obtain the AIK certificate, a certification request 162 may be sent to a certificate authority (CA) 160. Depending on the embodiment, the process of certifying the AIK may be performed in a variety of methods. For example, the TCG standards provide protocols such as the Direct Anonymous Attestation (DAA) protocol and Privacy Certificate Authority protocol to certify the AIK and tie the AIK to the TPM. In some embodiments, the EK 132 is used to prove to the CA 160 that the request came from a genuine TPM 110. Once the request is verified, the CA 160 may sign the AIK credential, and encrypt it using the public EK key. Thus, the AIK is cryptographically bound to the TPM that contains the private EK key. In some embodiments, the TPM 110 may use the AIK 134 to signed the contents of the PCR registers 120, when their contents are requested in via a attestation request 152.

As shown, in some embodiments, the device 100 may implemented one or more applications 142 that can provide attestations of 152 of the device 100 to other entities 152. In some embodiments, the attestations 152 may be provided to software entities executing within the device 100. In some embodiments, the attestations 152 may be provided to remote entities. As discussed, the attestation mechanism may be used to provide an integrity report of the device 100, before the device 100 is used to perform certain protected operations. In some embodiments, the contests of the PCR registers 120 provided in an attestation may be signed by the AIK 134. Thus, a requesting entity that has possession of the public AIK may use the public key to verify the source of the attestation. In some embodiments, the persistent identifier 136 and the public key of the persistent key pair 138 may be provided to other entities 150 by extending a measurement of such data to the PCRs 120, and then attesting the measurement using a TPM quote signed by the AIK.

Figure 2:
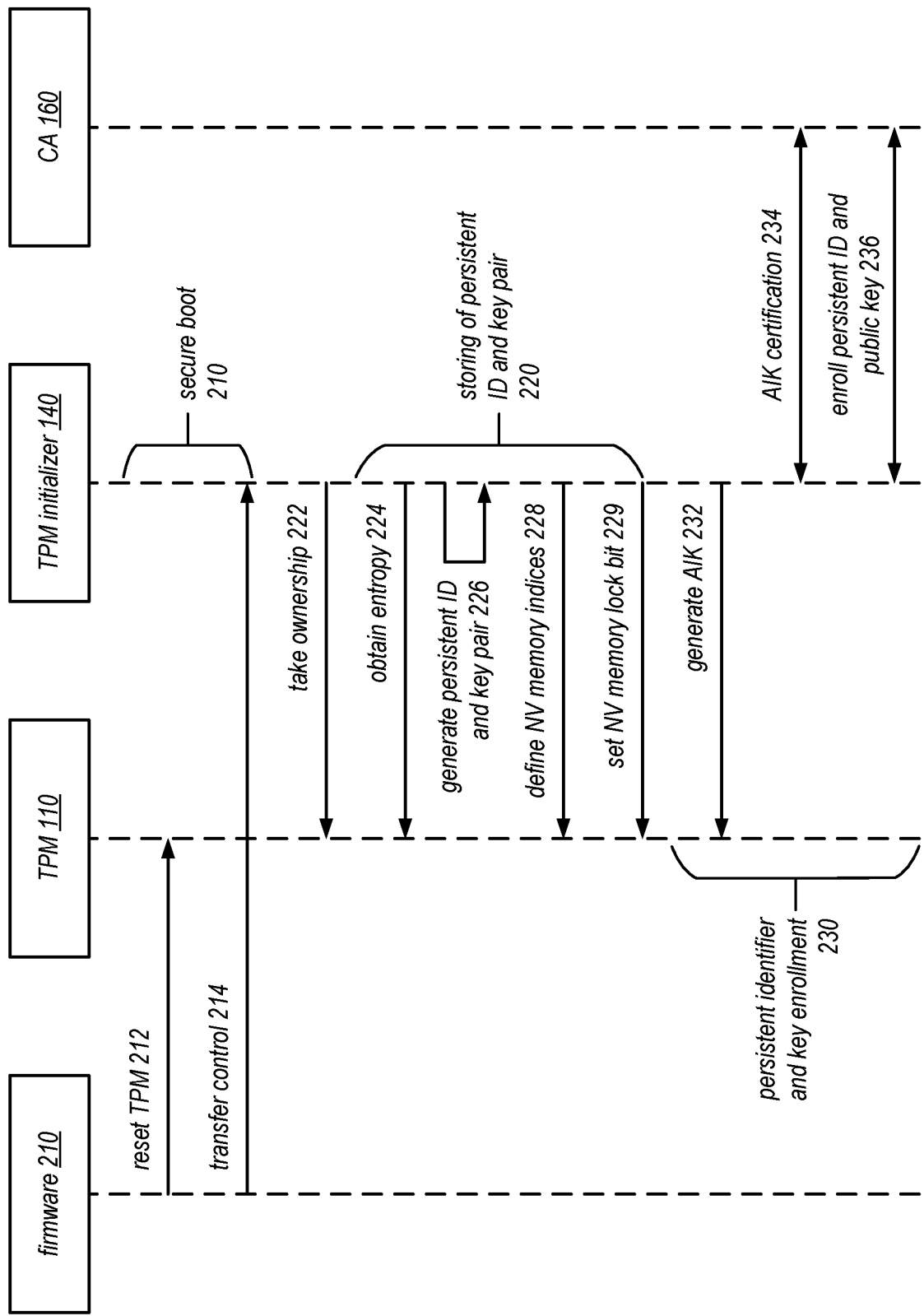
FIG. 2 is a system sequence diagram illustrating interactions between entities and components to generate a persistent identifier and key pair using a TPM, according to some embodiments.

FIG. 2 is a system sequence diagram illustrating interactions between entities and components to generate a persistent identifier and key pair using a TPM, according to some embodiments.

As shown, the process starts at interaction 212, where the firmware 210 resets the TPM. The firmware 210 may be, for example, the firmware controlling the boot process of the device 100. In some embodiments, the reset may be performed via a reset operation implemented by the TPM 110, which may reset all configurations of the TPM 110 back to the factory default settings. In some embodiments, the reset operation may erase the storage root key (SRK), if any, stored on the TPM 110. In some embodiments, the reset operation may not change the endorsement key (EK) of the TPM 100.

In some embodiments, the reset operation may not change or delete a persistent identifier 136 or persistent key pair 138 stored on the TPM 110. Thus, for example, if these persistent data have already been established on the TPM 110, for example via a prior take ownership operation on the TPM, they are not modified by the reset operation. In some embodiments, if it is determined that the persistent data structures already exist on the TPM 110, the system (e.g. TPM initializer 140) may skip some of the operations or interactions to establish these persistent data structures, for example, interactions 224, 226, 228, and 229.

In some embodiments, following the reset of the TPM, the process may proceed to interaction 214, where control is transferred from the firmware 210 to the TPM initializer. In some embodiments, the TPM initializer 140 may be stored outside of the TPM 110 itself, for example in a storage on the platform that is coupled to the TPM. In some embodiments, the TPM initializer 140 may execute at least partly outside of the TPM 110.

As shown, in some embodiments, interactions 212 and 214 may occur as part of a secure boot sequence 210. In some embodiments, in a secure boot sequence, the TPM may take measurements of particular parameters that reflect the state of the TPM or platform during different stages of the boot sequence. The measurements may be captured in the PCRs of the TPM, which may be later used for attestations of the TPM or trusted platform. In some embodiments, the capturing of measurements during the secure boot sequence may occur prior to the device takes ownership of the TPM.

As shown, once the TPM initializer 140 receives control, the TPM initializer may perform a take ownership operation 222 of the TPM. In some embodiments, the take ownership operation 222 may create the storage root key 133 of the TPM 110. In some embodiments, the owner authorization data may also be saved to the non-volatile memory 130 of the TPM 110. In some embodiments, other data that are associated with ownership.

As shown, the TPM initializer 140 may also obtain an entropy 224 from the TPM 110. In some embodiments, the entropy value may be a random or pseudorandom value obtained from the TPM 110 itself, for example, via the random number generator 125. In some embodiments, the entropy may be obtained via other mechanisms, without using the TPM 110.

As shown, at interaction 226, the TPM initializer 140 may generate a persistent identifier and key pair for the platform. In some embodiments, the generation may be performed at least partly using the TPM 110, for example via the key generator 123 or the random number generator 125. In some embodiments, the persistent identifier may be generated from the entropy obtained in interaction 224. In some embodiments, the entropy value may simply be used as the persistent identifier. In some embodiments, the persistent identifier may be generated so that it is unique for among other platforms that employ a similarly generated persistent identifier. In some embodiments, the persistent identifier may be unique above a threshold probability. In some embodiments, the uniqueness may be guaranteed by other means, for example by using a monotonically increasing counter. In some embodiments, the persistent key pair may be generated based on the persistent identifier. In some embodiments, the persistent identifier may simply be used as one of the two keys in the pair (e.g., the public key). Thus, in some embodiments, only two values need to be stored in the non-volatile storage of the TPM 110.

As shown, at interaction 228, the TPM initializer 140 may define non-volatile memory indexes for the generated persistent data structures. In some embodiments, the non-volatile memory (e.g., memory 130) may be addressable using a set of indices, so that each index corresponds to a distinct memory location. In some embodiments, the indices may be reference in memory write commands implemented by the TPM 110. These commands may then be used permanently write values to the TPM's non-volatile memory.

In some embodiments, to a value in the non-volatile memory, the TPM initializer 140 may issue a first write command to write the value to a particular memory location. In some embodiments, the first write command may cause a define bit or "D" bit to be set for that memory location. In some embodiments, the D-bit may be set prior to the first write command. In some embodiments, the memory location may be rewritten until a zero-length write to the same location via another write command. After the zero-length write, that particular memory location becomes immutable, and any subsequent writes to the location will result in a failure.

As shown, at interaction 229, the TPM initializer 140 may set a lock bit associated with the non-volatile memory. In some embodiments, the setting of the lock bit locks the contents of all storage locations with the D-bit set, so that they can no longer be altered for the operating lifetime of the TPM device 110. In some embodiments, the setting of the lock bit causes the contents of the indexed locations to be permanently written to the hardware medium of the non-volatile memory. In some embodiments, data written in the above manner cannot be erased or modified via a factory reset operation provided with the TPM 110.

As shown, in some embodiments, the operations 224, 226, 228, and 229 may comprise a sequence of events 220 to store the persistent identifier, which is performed by the TPM initializer 140. The sequence 220 may be a one-time process that is performed only once during the lifetime of the TPM device. In some embodiments, the sequence may be programmed as additional operations to be performed by the TPM initializer 140 performs as part of the take ownership operation 222. Depending on the embodiment, some of the interactions in the sequence may be skipped, and the interactions may occur in a different order from the order shown in the diagram.

As shown, at interaction 232, an AIK is generated for the TPM. In some embodiments, the AIK may be generated by the TPM 110 itself, for example via the key generator 123. In some embodiments, the AIK may be generated elsewhere, for example by the certificate authority 160. As discussed, the AIK may be generated as a proxy for the EK of the TPM, and may be used to sign data. The TPM 110 may generate multiple AIKs for different purposes. The AIKs may be generated after and separately from the take ownership process, and may be performed on an as-needed basis.

As shown, at interaction 234, the AIK is certified 234 with a certificate authority 160. Depending on the embodiment, the certification process may be performed in a variety of different ways to tie to the AIK to the TPM's EK. For example, the certification process may be performed using different protocols such as the Direct Anonymous Attestation (DAA) protocol or the Privacy CA protocol. In some embodiments, the TPM 110 may create an identity proof structure that contains the AIK public key, the EK certificate, and the platform certificate, and the platform (e.g., via the TPM initializer) may then provide the identity proof structure to the CA 160. The CA 160, in turn, may then verify the contents of the identify proof structure, and then create a new AIK certificate using the AIK public key. The CA 160 may encrypt the AIK certificate using the EK and sign the AIK certificate using its own AIK signing key. The CA 160 then returns the AIK certificate to the platform. The AIK key pair may be used for a number purposes, including signing (using the AIK private key) TPM data such as TPM quotes that report the contents of the PCR registers. Such TPM data may then be verified using the AIK public key contained in the AIK certificate.

As shown, at interaction 236, the persistent identifier and the public key of the persistent key pair may be enrolled via the CA 160. In some embodiments, the persistent identifier and public key may be enrolled using a similar process as used for the AIK, to obtain a certificate for the persistent identifier and the public key. In some embodiments, the CA 160 may encrypt the certificate with the public EK key of the TPM, so that the persistent identifier and public key are tied to the TPM's EK key. The certificate may then be returned to the platform.

As shown, interactions 232, 234, and 236 may be performed as part of a persistent identifier and key enrollment process 230, which may be performed separately from the persistent identifier establishment process 220. At the end of sequences 220 and 230, the platform will possess a certified persistent identifier 136 that is independent of any operations that may affect the SRK (e.g., a TPM reset operation). Thus, the persistent identifier 136 is not tied to the SRK, and it will be persistent throughout the operating lifetime of the TPM 110. Moreover, the TPM 110 and its associated platform 100 can assert proof of its persistent identity by using the private key of the persistent key pair 138 to sign a nonce, etc.

Figure 3:
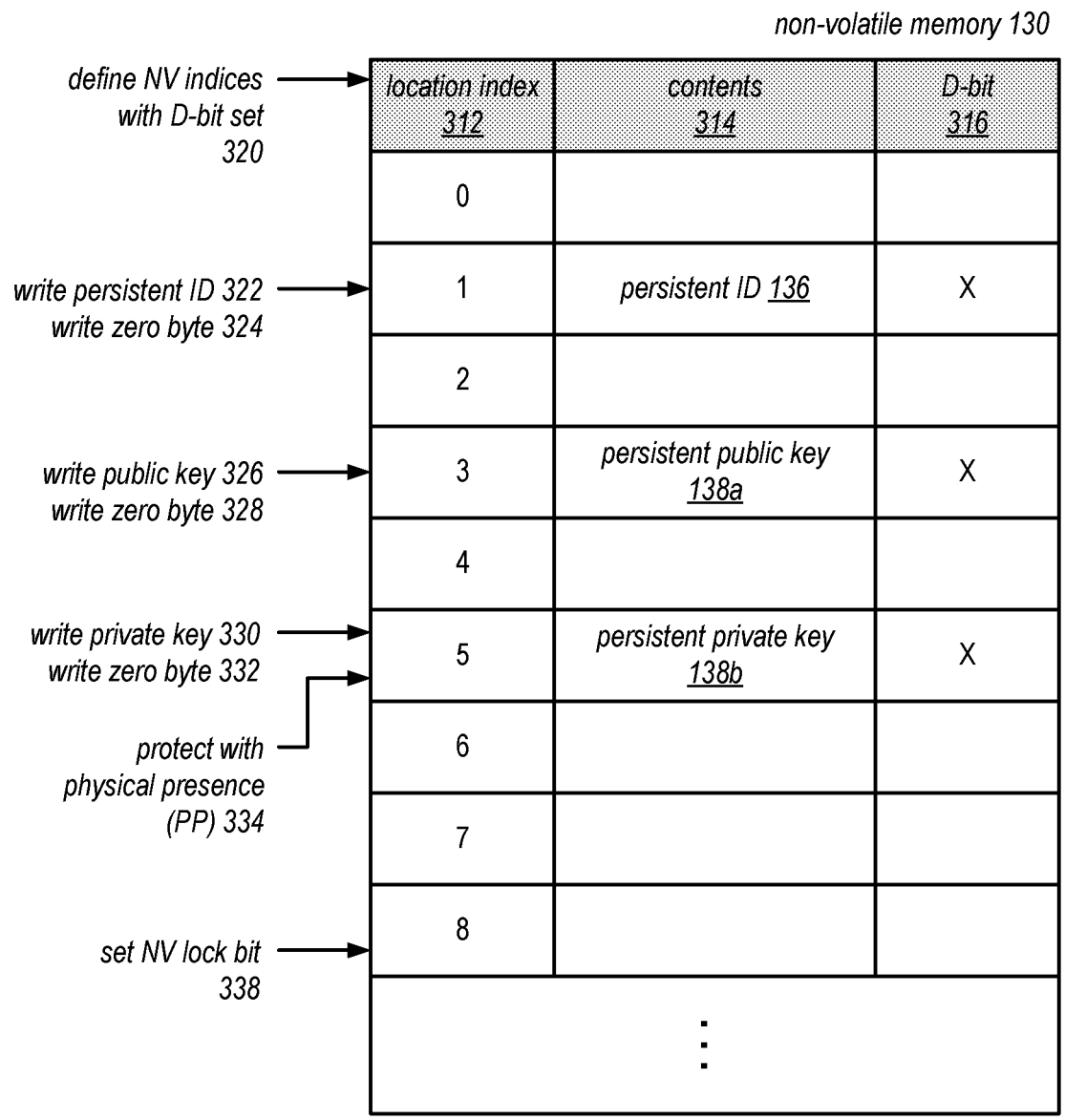
FIG. 3 illustrates an indexed non-volatile memory in a TPM that is used to define and store a persistent identifier and key pair tied to the TPM, according to some embodiments.

FIG. 3 illustrates an indexed non-volatile memory in a TPM that is used to define and store a persistent identifier and key pair tied to the TPM, according to some embodiments. As shown, the figure depicts the non-volatile memory 130 of the TPM 110, as discussed in connection with FIG. 1.

In some embodiments, the non-volatile memory 130 may be organized into a plurality of indexed memory locations. For example, as shown, the non-volatile memory 130 has 9 indexed locations with associated indices 312 from 0 to 8. In addition, in some embodiments, each location may include a define bit or D-bit 316. The D-bit may be used to indicate which locations are currently being written to for persistent storage in the non-volatile memory. In some embodiments, the TPM 110 may provide commands that allow the D-bit to be set upon the writing of a particular storage location. In some embodiments, the TPM 110 may implement a lock bit for the non-volatile memory, such that when the lock bit is set, all memory locations with the D-bit 130 set will be permanently written to the storage medium of the non-volatile memory, so that their contents cannot be erased or modified (e.g. via a reset operation of the TPM).

The figure illustrates a number of operations performed on the non-volatile memory to write the persistent identifier 136 and persistent key pair 138 to the memory. As shown, a operation 320 may be performed to set the D-bits on the memory locations that will be used to store the persistent data. In some embodiments, operation 320 may be performed using an explicit command that defines a write mode for the non-volatile storage. In some embodiments, one command may be issued to set the D-bit for each storage location. In some embodiments, the D-bit may be set with a write command to the storage location.

As shown, in operation 322, the persistent identifier 135 is written to the storage location at index 1. In some embodiments, the D-bit may be set in conjunction with the write operation. In some embodiments, depending on the mode of the non-volatile memory, the storage location may be rewritten until a zero byte write 324 is performed on the storage location. After that point, subsequent writes to the storage location will be ineffective. As discussed, in some embodiments, the persistent identifier 136 may simply be the entropy value obtained by the TPM initializer 140. In some embodiments, the entropy value may be a 64-byte value that is statically unique for among all similarly generated entropy values. In some embodiments, the entropy may be generated in a manner that guarantees its uniqueness.

As discussed, in some embodiments, a random public/private key pair may be derived using the entropy value. These two keys may be part of the persistent key pair 138 and be stored in two separate locations in the non-volatile memory 130, as shown by operations 326, 328, 330, and 332. The writing of these two keys may be performed in a similar fashion as the writing of the persistent identifier in operations 322 and 324. For example, for each of the keys 138a and 138b, the write may be performed by writing the contents of the data to the location, followed by a write of zero bytes to make these contents immutable.

As shown, in operation 334, the storage location 5 for storing the persistent private key 138b is protected with physical presence. In some embodiments, the TPM 110 may be configured so that an assertion of physical presence may be required to perform certain activities using the TPM. Physical presence implies a direct interaction by a person, for example, an operator working on the platform or TPM. Physical presence may be required to perform certain basic administrative tasks associated with the TPM, such as clearing an existing owner from the TPM, or temporarily deactivating or disabling the TPM. In some embodiments, the TPM may expose commands that allow a user to specify that certain actions (e.g., the reading or writing of a non-volatile memory location) can only be performed with physical presence confirmed. Thus, by setting physical presence protection no the storage location for the private key, the process ensures that the private key cannot be read or written by external entities without physical presence. In some embodiments, the writing process may also lock down or disable assertions of physical presence, so that after that point, no outside entity may access the persistent private key. This setting may ensure that, for example, on a next reboot of the platform, another TPM initialization process cannot access the persistent private key 138b.

As shown, in operation 338, a lock bit or setting associated with the non-volatile memory 130 is set. In some embodiments, the lock bit must be unset for writes to the non-volatile memory to occur. In some embodiments, once the lock bit is set, the contents of all locations with the D-bit set are permanently written into the medium of the non-volatile memory, so that they can never be modified or erased using software means. In some embodiments, the lock bit or flag may only be set once during the lifetime of the TPM. Thus, as shown, operation 338 permanently seals the contents of the locations 1, 3, and 5, permanently storing the persistent identifier 136 and persistent key pair 138 in the non-volatile memory on the TPM device.

Figure 4:
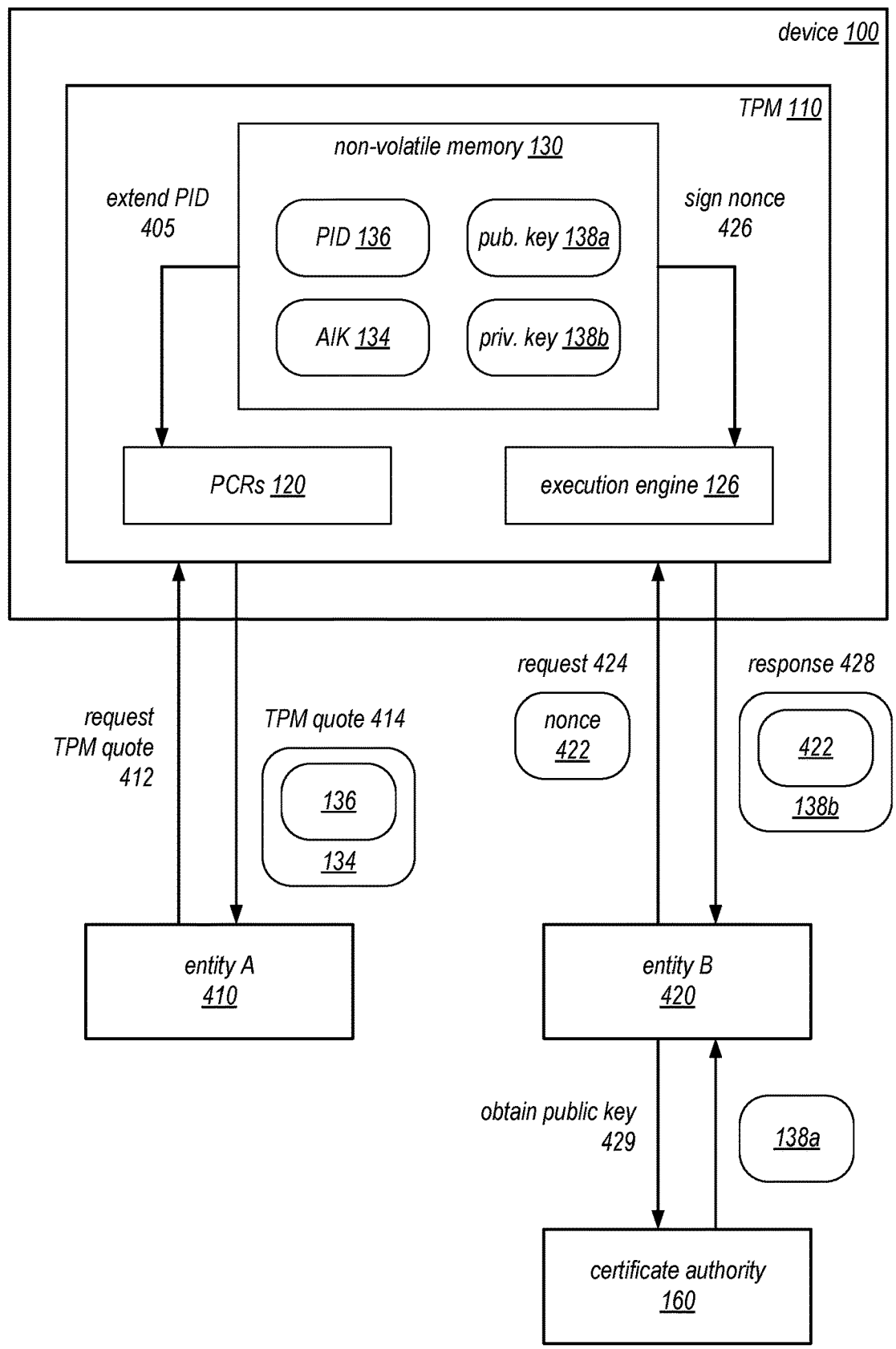
FIG. 4 illustrates interactions between a device and entities to access the device's persistent identifier and verify the device's identity using the persistent key pair, according to some embodiments.

FIG. 4 illustrates interactions between a device and entities to access the device's persistent identifier and verify the device's identity using the persistent key pair, according to some embodiments. The figure depicts two different entities, entity A 410 and entity B 420, which interact with the device 100 in two different ways. The illustrated interactions may occur after the TPM 110 has been initialized by the TPM initializer 140. As shown, at this point, the TPM 110 may store the persistent identifier 136, persistent public key 138a, persistent private key 138b, and an attestation identity key 134 in its non-volatile memory 130.

In some embodiments, as shown, the TPM 110 may extend 405 the persistent identifier 136 into its PCR registers 120. In some embodiments, the TPM 110 may also extend the persistent public key 138a into the PCRs 120. In some embodiments, the persistent identifier 136 and persistent public key 138a may be combined with an older value of the contents of a PCR register, and hashed to create a new value. This new value reflects the results of all configuration of the trusted platform 100, and so, a entity may verify the persistent identifier 136 of the platform 100 via the a TPM quote.

For example, in some embodiments, entity A 410 may send a request 412 for a TPM quote to the device 100 or TPM 110. The TPM may then generate a TPM quote 414 containing the contents of the PCR registers 120, and send the quote back to the entity A 410. As shown, the TPM quote 414 may include the persistent identifier 136, and may be signed by the TPM's AIK 134. Accordingly, the entity 410 may verify that the source of the TPM quote both via the AIK 134 and the persistent ID 136. In some embodiments, the persistent identifier 316 may be mixed with other system configurations in a hash value, and the entity 410 may use the hash value to verify that the device has an expected identity and set of configurations. In some embodiments, the entity A 410 may condition certain operations using the device 100 upon the verification of the TPM quote 414.

In some embodiments, the entity A may be part of a control plane system that verifies a large number of devices 100 based on their respective TPM quotes. As one example, a data center may employ TPM-based peripherals such as network interface devices, and the control plane system of the data center may track the network devices using their TPM-based persistent identifiers, so that an unrecognized network interface cannot be used in the data center's operations. By making the identifier 136 persistent to the TPM 110 and the device 100, the device guarantees that the identifier can never be tampered with after its initial setting. In addition, the device simplifies the task of administration of the devices 100, because the persistent identifiers 136 remain static over reset operations and ownership taking operations, which means that the identities of these devices need not be manually updated in the control plane database.

In some embodiments, as shown, the TPM 110 may execute code to service other types of requests from entities, such as entity B 420. In this example, entity B 420 may send a request 424 to verify the identity of the device 100. In this type of request, the entity 420 may include a nonce 422, which is a one-time value that is used to challenge the device's identity. In some embodiments, the device 100 may receive the request, and then use the TPM 110 to sign 426 the nonce using the persistent private key 138b stored in the TPM's non-volatile memory. In some embodiments, this operation may be performed by the execution engine 126, the RSA engine 122, or a combination of these or other components within the TPM 110. Once the nonce 422 is signed or encrypted using private key 138b, the nonce may be returned in a response 428 back to the entity B 420.

In some embodiments, the entity B 420 may obtain 429 the public key 138a for the persistent key pair from a trusted source such as the CA 160. In some embodiments, the public key 138a may be obtained from another source, but because it is wrapped in a certificate generated from the CA 160, the entity B 420 can readily verify the contents included in the certificate. Once the entity B 420 has the public key 138a, it can then use the public key to verify the response 428, which is signed or encrypted using the private key 138b. The entity B 420 can then determine whether the resulting nonce matches the nonce that it generated for the request 424, and if so, the entity can be certain that the responder is indeed the device 100 that is associated with the public key 138a.

As may be appreciated by those skilled in the art, these interactions are just a couple of examples of how a persistent identity and key pair may be used by entities interacting with the device 100 and TPM 110. In some embodiments, the entities may be software executing on the device 100 itself, and the TPM 110 may be used to perform different security tasks for these entities. In some embodiments, the persistent identifier may be combined with other persistent identifiers to form a composite persistent identifier that uniquely identifies all components of a larger system. In some embodiments, the persistent identifiers may be used to trace the path of a data flow from system to system. All of these use cases may be implemented using the persistent identifier and persistent key pair described herein, and these use cases are all contemplated within the scope of this disclosure.

Figure 5:
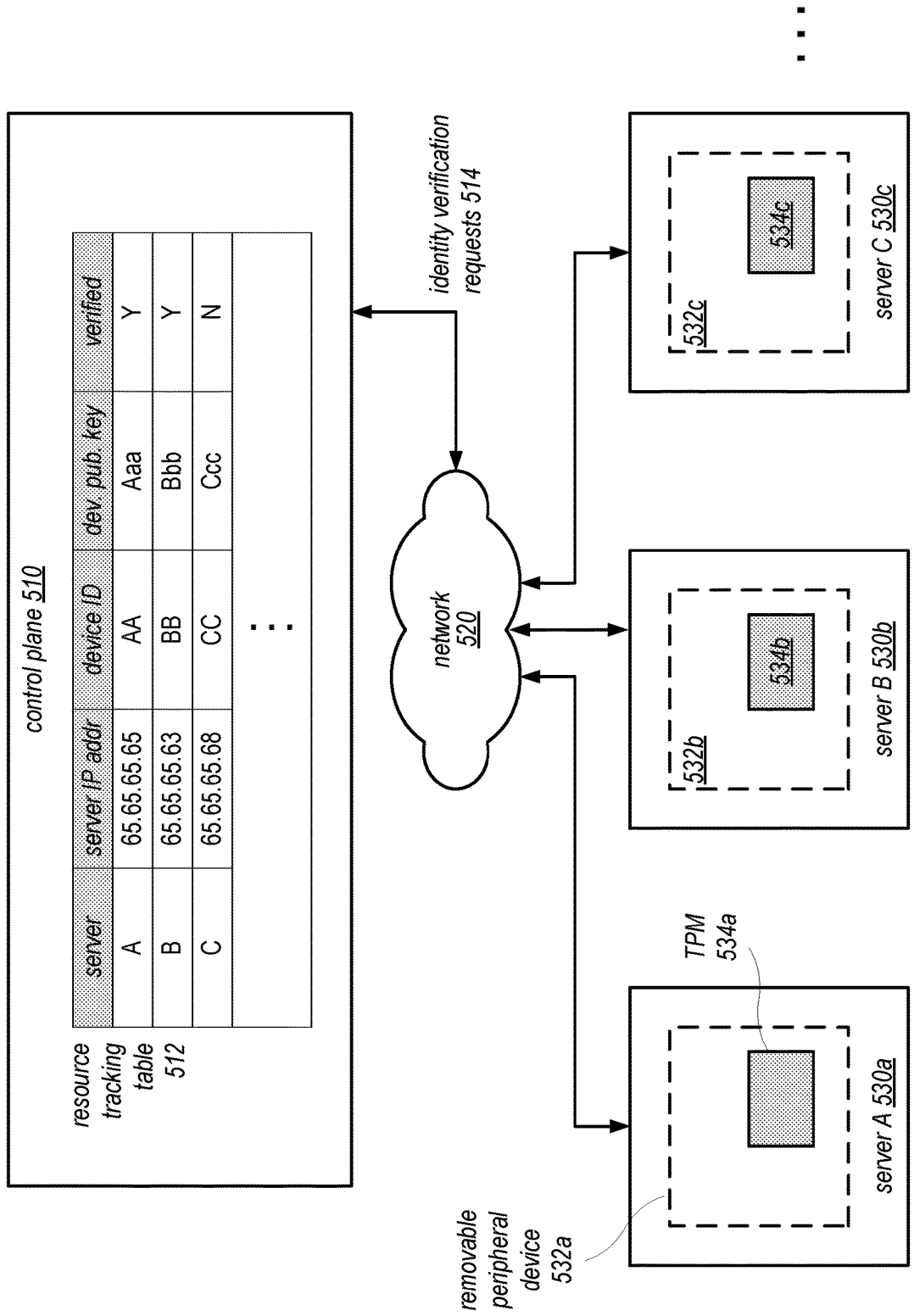
FIG. 5 is a block diagram illustrating a control plane system that manages multiple devices using their persistent identifiers, according to some embodiments.

FIG. 5 is a block diagram illustrating a control plane system that manages multiple devices using their persistent identifiers, according to some embodiments.

As shown, the control plane 510 may manage or track a number of servers 530a-c, which may be located for example at a data center. In some embodiments, the servers 530 and the control plane 510 may communicate over a control network 520. As shown, the servers 530 may each have a removable peripheral device 532a-c, respectively. In some embodiments, the removeable peripheral devices may comprise a dongle, a removable storage device, a network interface card, a USB device, among other things. In some embodiments, each of the devices 532 may include a TPM device 543a-c. In some embodiments, the devices 532 may comprise a device 100 as shown in FIG. 1, and the TPMs 534 may comprise a TPM 110 as shown in FIG. 1.

In some embodiments, because the devices 532 are removable, they may be occasionally moved and/or provisioned to other servers. In some embodiments, a move or provisioning of the device may involve a reset operation, or a new take ownership operation by the device on the TPM. In some embodiments, the move or provisioning will cause the TPM to lose its impermanent data, such as its SRK and AIKs, etc. However, using the techniques discussed previously, the devices may store a persistent identifier and key pair in the TPM, so that these data structures will be preserved as the device moves from server to server. These persistent data structures also ensure that no one can maliciously or accidentally modify the identifiers for the devices via routine administration, etc. Accordingly, the persistent identifier greatly simplifies the management of these devices.

As shown, in some embodiments, the control plane 510 may maintain a resource tracking table 512 that tracks the devices 532. In some embodiments, the table may track the devices' persistent identifier, and the currently associated server, via for example the server's IP address. The mapping from server to device may be enforced via certain change policies for the data center. If an unauthorized or unexpected move of a device 532 is detected, the control plane 510 may have the capability to immediately prevent the device from being used. Thus, for example, where the devices are network cards, an unexpected move of a network card may cause the control plane to prevent that network card from being to receive or sent any traffic. This protection scheme prevents anyone from maliciously slipping a foreign network card into a server in the data center.

In some embodiments, the control plane 510 may have the ability to periodically send identity verification requests 514 the servers and their removable peripheral devices. In some embodiments, the requests 514 may request TPM quotes, either from the device TPM 534 or the server's TPM, which may report back the device's configuration information, including the device's persistent identifier. The control plane 510 may verify the received TPM quotes with known configuration values before allowing the server or device to be used. In some embodiments, the requests may comprise a request using nonce, which the TPM 532 may sign using its persistent private key. As shown, the control plane 510 may possess the TPM's persistent public key, which may be used to verify that the nonce was encrypted by the private key holder. Again, if the verification fails (e.g., for device CC as shown), the control plane 510 may perform corrective action such quarantining or shutting down the server.

Figure 6:
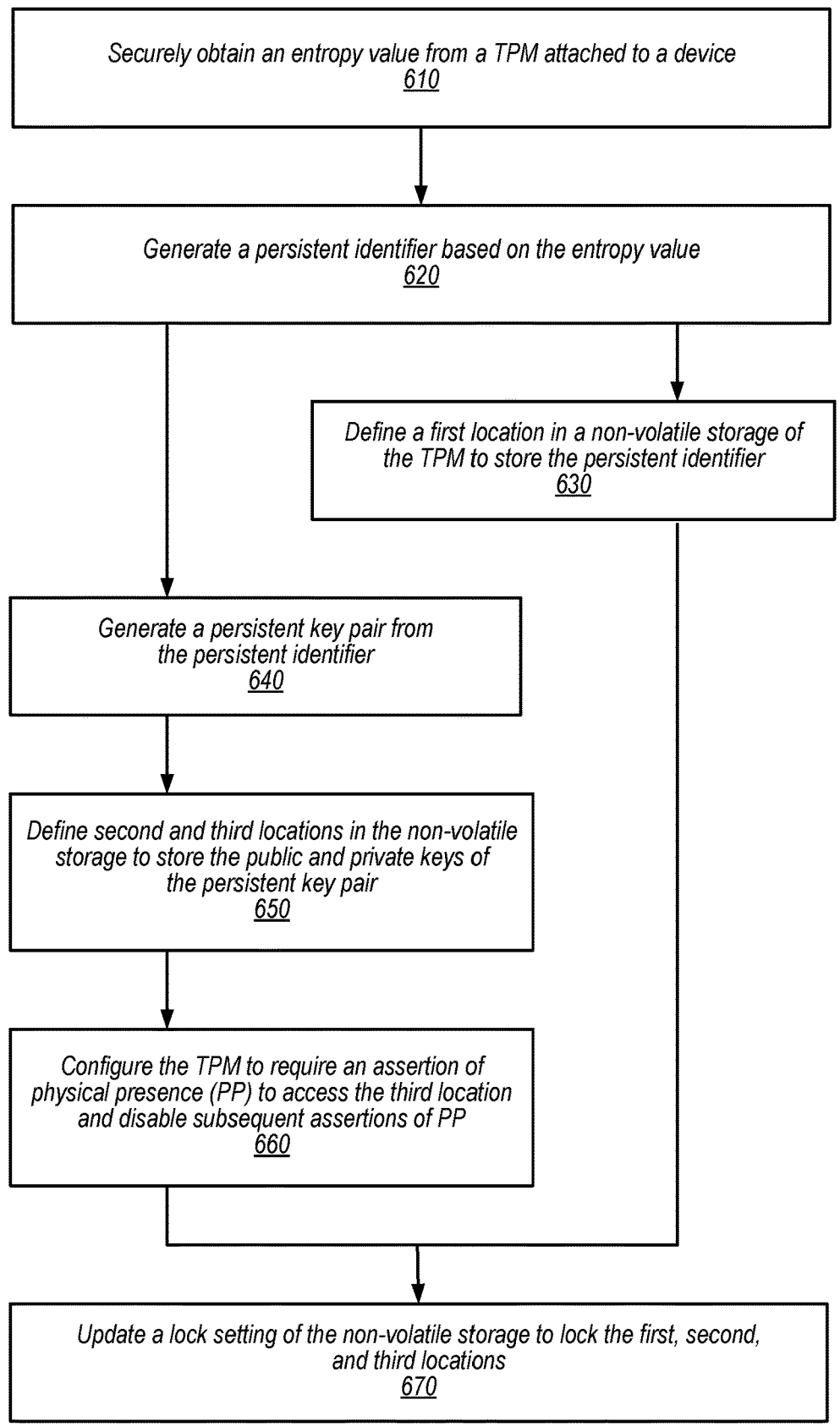
FIG. 6 is a flowchart illustrating a process of generating a persistent identifier and key pair using a TPM, according to some embodiments.

FIG. 6 is a flowchart illustrating a process of generating a persistent identifier and key pair using a TPM, according to some embodiments. The process shown in the figure may be performed by, for example, the TPM initializer 140, as discussed in connection with FIG. 1. In some embodiments, the process may be a one-time process performed following or as a part of an ownership taking operation of the TPM. In some embodiments, the process may be a one-time process performed following or as part of a secure boot process of the device attached to the TPM.

As shown, the process begins at operation 610, where an entropy value is securely obtained from a TPM of a device. In some embodiments, the entropy value may be generated by the TPM in a secure fashion, so that outside entities cannot tamper with the generation process. In some embodiments, the entropy value may be a true random value. In some embodiments, the entropy value may be a pseudorandom value that is generated in a deterministic fashion. In some embodiments, the entropy value may be generated from a random number generator, such as random number generator 125 of FIG. 1.

At shown, at operation 620, a persistent identifier is generated based on the entropy value. In some embodiments, the entropy value may simply be used as the persistent identifier. In some embodiments, the entropy value may be used in a function to compute the persistent identifier. In some embodiments, the persistent identifier may be determined so that that it is sufficiently unique (e.g., greater than a specified probability) among a group of similarly generated identifiers (e.g., for a group of similar devices with attached TPMs).

At operation 630, a first location in a non-volatile storage in the TPM is defined to store the persistent identifier. In some embodiments, the TPM may expose a set of commands that allow clients to programmatically write to the non-volatile storage, which may be for example the non-volatile memory 130 of FIG. 1. In some embodiments, the commands used may include a command to define an indexed location in the non-volatile memory to be associated with a value. The commands may also include a command to write the value of the persistent identifier into that location. The commands may then include a command to write a zero-length value to that location. In some embodiments, the command to define the location and the command to write the value may be implemented as a single command. In some embodiments, the defining of the location may cause a define bit or D-bit to be set for that location. In some embodiments, the writing of the location may only occur when a one-time lock bit or flag is unset for the non-volatile memory, and once the lock bit or flag is set, the contents of all locations with the D-bit set are permanently written to the medium of the storage memory, so that they cannot be altered or erased using software means.

At operation 640, a persistent key pair is generated from the persistent identifier. As shown, operations 640, 650, and 660 may be performed independently on a separate branch from operation 630, so that the two branches may be performed before, after, or in parallel with the other. In some embodiments, the persistent key pair may be generated using the key generation module 123 of the TPM, as shown in FIG. 1. In some embodiments, the key pair may be generated without using the TPM. In some embodiments, the generated key pair may comprise a public key and private key, which may be used in the RSA encryption and decryption algorithm. In some embodiments, one of the two keys in the key pair (e.g. the public key) may simply be the persistent identifier. Thus, in some embodiments, less than three values may be stored in the non-volatile memory.

At operation 650, a second and a third location are defined in the non-volatile storage to store the public and private keys of the persistent key pair. The storage of these values in the non-volatile storage may be performed in similar fashion as the storage of the persistent identifier. Thus, for example, the key value may be written to an indexed location of the non-volatile memory with the D-bit for that location set, followed a zero-length write to that same location.

At operation 660, the TPM is configured to require an assertion of physical presence (PP) to access the third location holding private key of the persistent key pair. In some embodiments, PP indicates a requirement that some operations of the TPM can only be performed with a person present. Thus, the configuration of the TPM in this operation protects the contents of the third location (i.e. the private key) from being accessed without the physical presence of an operator. In some embodiments, the operation also then disables subsequent assertions of PP. Thus, this locking down of PP further ensures that no outside actor can access the private key of the persistent key pair. For example, no subsequent reboot or ownership taking operation will be able to access the persistent private key. In some embodiments, operation 660 may be performed after the writing of the third location. In some embodiments, operation 660 may be performed before the write. In some embodiments, operation 660 may be performed after operation 670, when the lock setting is set for the non-volatile storage.

After all the defining and writing of all three locations are completed, as shown, the process proceeds to operation 670, where a lock setting of the non-volatile memory is updated to lock the first, second, and third locations. In some embodiments, the lock setting may comprise a lock bit associated with the non-volatile storage. In some embodiments, the lock bit may be a one-time bit that can only be set once, and once it is set, the contents of all indexed locations in the non-volatile storage will be permanently written to the medium of the non-volatile storage, making them impossible to modify or erase via software. In some embodiments, data locked in this manner cannot be reset with a reset operation of the TPM, and will persistent for the remaining lifetime of the TPM.

Figure 7:
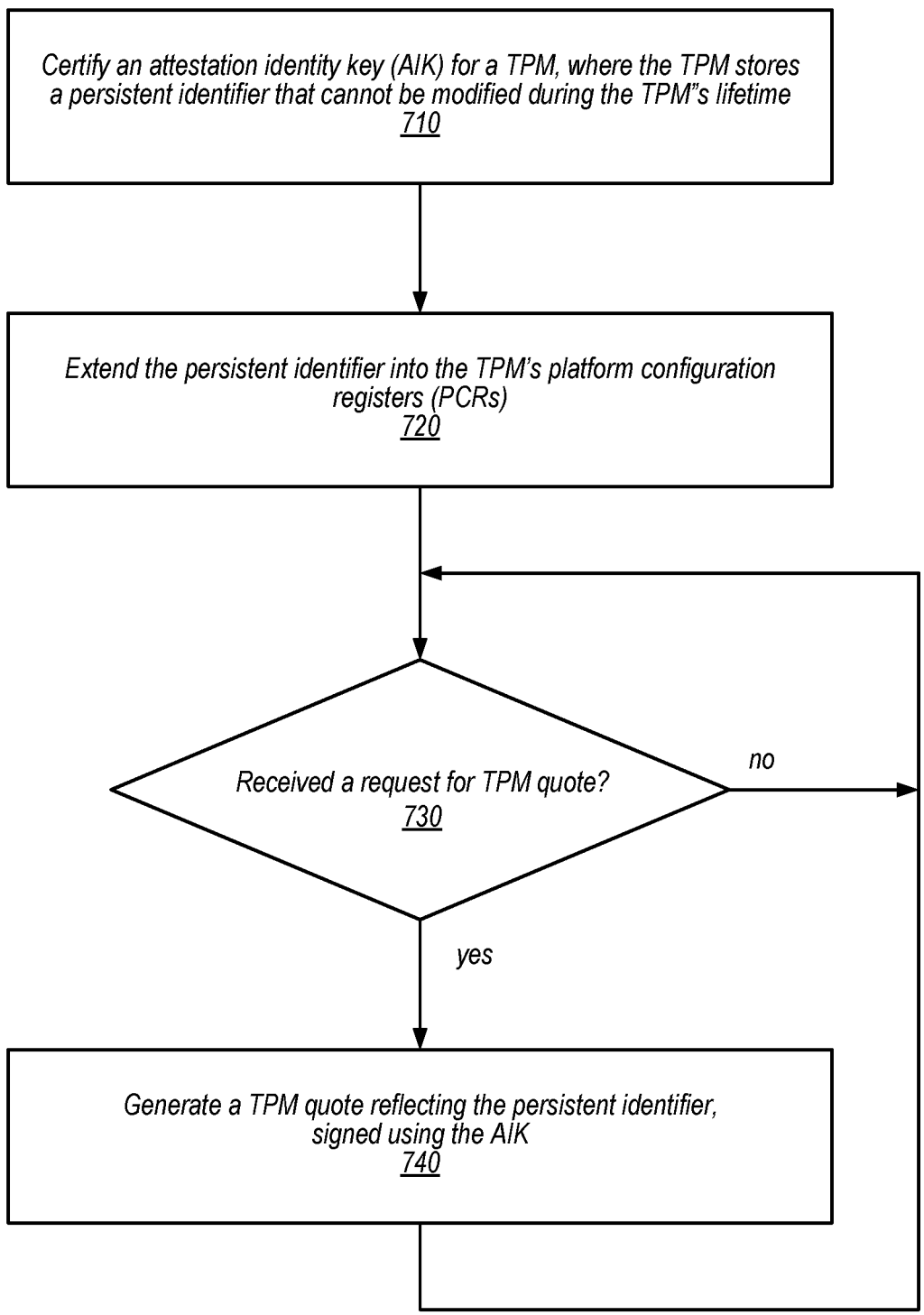
FIG. 7 is a flowchart illustrating a process of generating a TPM quote reflecting a persistent key tied to the TPM, according to some embodiments.

FIG. 7 is a flowchart illustrating a process of generating a TPM quote reflecting a persistent key tied to the TPM, according to some embodiments. In some embodiments, the process of FIG. 7 may be performed by a platform having a TPM, such as the device 100 of FIG. 1.

At operation 710, an attestation identity key (AIK) is certified for a TPM, where the TPM stores a persistent identifier that cannot be modified during the TPM's operating lifetime. The persistent identifier may be for example the persistent identifier 136, as described in FIG. 1. The AIK may be for example the AIK 134 described in FIG. 1. In some embodiments, the AIK may be generated by the TPM itself, for example, using the key generator 123 shown in FIG. 1. In some embodiments, the AIK may comprise a public and private key pair, and the public key may be sent in conjunction with other credentials (such as the TPM's EK and the platform's credentials) to a certificate authority such as the CA 160 of FIG. 1. The CA 160 may then verify the credentials, enroll the AIK, and return its own certificate certifying the AIK as being tied to the TPM and/or platform.

The certification may be performed using a variety of certification protocols, such as a direct anonymous attestation (DAA) protocol or a privacy certificate authority protocol.

At operation 720, the TPM may extend the persistent identifier into the TPM platform configuration registers. The platform configuration registers may be for example PCRs 120 as discussed in connection with FIG. 1. In some embodiments, the extension may be performed by combining the persistent identifier with previous values in a PCR into a single hash value. Thus, the persistent identifier becomes part of the representation of the configuration of the platform, which may then be provided in a TPM quote to verify the device's configurations. In some embodiments, the configuration may also include measurements made during the device's boot sequence. In some embodiments, the public key of the persistent key pair may also be extended into the PCR registers, along with the persistent identifier. In some embodiments, the persistent identifier may not be combined with any other configuration data, so that an entity may obtain the actual persistent identifier via the TPM quote.

At operation 730, a determine is made whether a request for a TPM quote is received. In some embodiments, TPM-based systems may receive requests to provide configuration settings of the system, which may be maintained in the PCR registers of the TPM. These configuration settings may then be used to verify the system before the system is used to perform certain secured tasks. In some embodiments, the quote request may come from local entities, such as software programs executing on the system itself. In some embodiments, the request may come from remote entities, such as for example a control plane system that is managing a large number of device. As shown, the process may continually wait for requests for TPM quotes. If one is received, the process proceeds to operation 740.

At operation 740, a TPM quote is generated reflecting the persistent identifier, and signed using the AIK. The generated quote may then be returned to the requesting entity. In some embodiments, as discussed, the TPM quote may include both the persistent identifier and the persistent public key. In some embodiments, the persistent identifier may be combined with other configuration settings of the device. In some embodiments, the persistent identifier may be provided by itself (e.g., in a single PCR register), so that the entity may actually obtain the actual identifier. In some embodiments, the TPM quote is signed by the AIK, so that the entity can verify the TPM quote using the device's AIK. However, while the AIK of the device may change when the TPM is reset of taken over by a new owner, the persistent identifier of the TPM will never change. Thus, by exposing the persistent identifier via the TPM quote, the device is able provide a persistent and certified identifier to the rest of the world.

Figure 8:
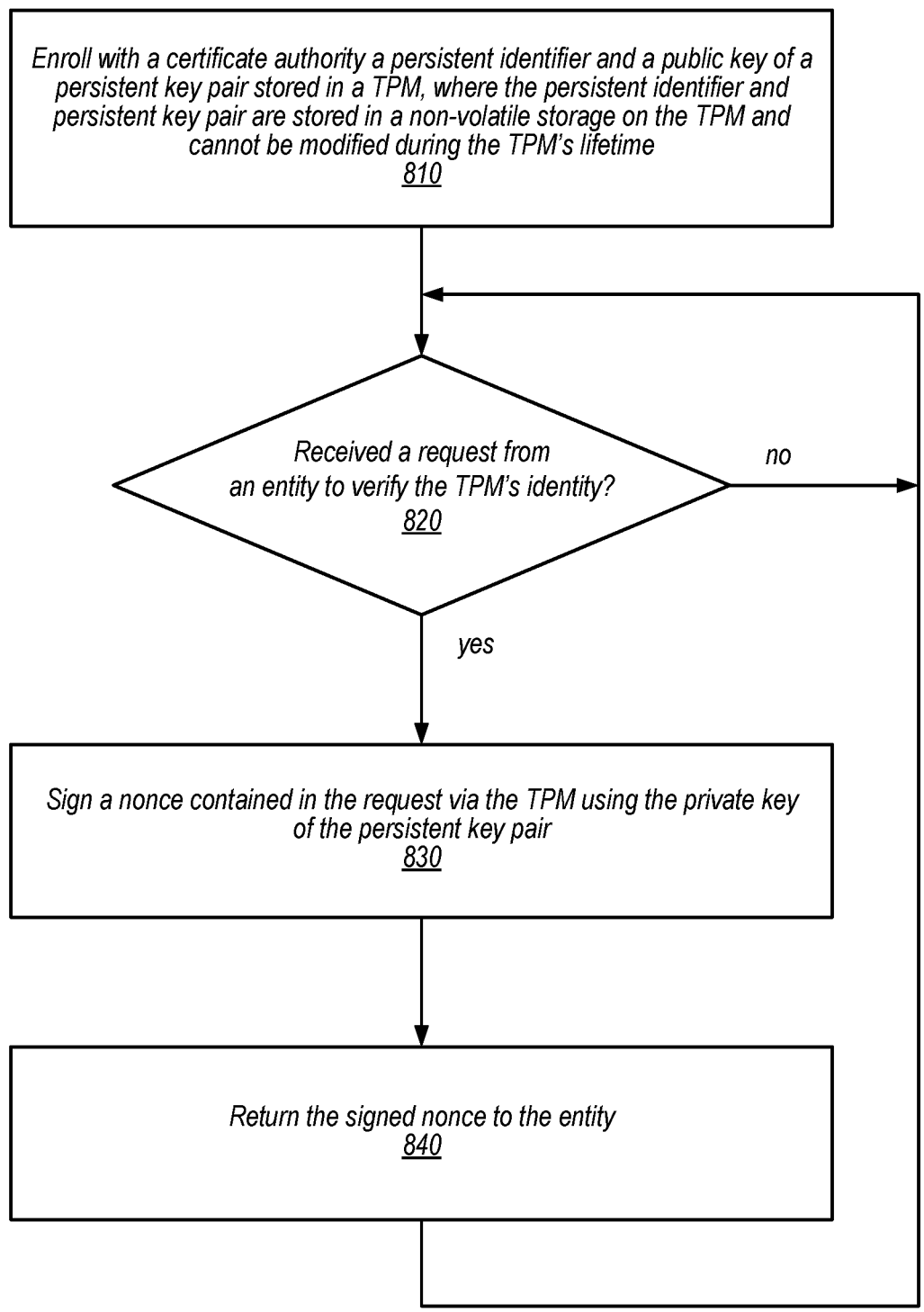
FIG. 8 is a flowchart illustrating a process of using a TPM to sign a nonce using a persistent private key tied to the TPM, according to some embodiments.

FIG. 8 is a flowchart illustrating a process of using a TPM to sign a nonce using a persistent private key tied to the TPM, according to some embodiments. In some embodiments, the process of FIG. 8 may be performed by a platform having a TPM, such as the device 100 of FIG. 1.

At operation 810, a persistent identifier and a public key of a persistent key pair stored in a TPM is enrolled with a certificate authority. In some embodiments, the persistent identifier may be persistent identifier 136, the persistent key pair may be persistent key pair 138, and the certificate authority may be CA 160, as discussed in connection with FIG. 1. As discussed, the persistent identifier and persistent key pair may be stored in a non-volatile storage of the TPM, such that they cannot be modified or erased during the TPM's operating lifetime. In some embodiments, the enrollment may be performed by providing the persistent identifier and public key to the CA, along with the TPM's EK and possibly the credential of the platform. In some embodiments, the CA may verify the EK and the credentials, and return a certificate associated with the persistent identifier and public key, indicating that they are tied to the TPM's EK. In some embodiments, this certificate may be retrieved by other entities from the CA.

At operation 820, a determination is made whether a request is received from an entity to verify the identity of a device that is attached to the TPM, where the request contains a nonce. In some embodiments, the entity may be a software program execution on the device. In some embodiments, the entity may be a remote entity executing on another computer system. In some embodiments, the nonce may be a one-time generated value used to challenge the device. As shown, the process may continually check for verification requests. If one is received, the process proceeds to operation 830.

At operation 830, the nonce is signed via the TPM using the private key of the persistent key pair. In some embodiments, the request may be received by the device which may in turn invoke a preprogrammed function of the TPM to sign the nonce using the private key. Although the private key may never leave the TPM, it may still be used by the TPM's internal functions to sign the nonce. The signing of the nonce may be performed, for example, by a combination of the execution engine 126 and the RSA engine 122, as discussed in connection with FIG. 1.

At operation 840, the signed nonce is returned to the entity. In some embodiments, the request and response may conform to a programmatic interface exposed by the TPM. In some embodiments, the request and response may be provided for a higher-level application programming interface or protocol. In some embodiments, the requesting entity may obtain the public key of the persistent key pair from another source. For example, entity may retrieve the public key from the CA that enrolled the public key. With the public key, the entity may decrypt the nonce that is encrypted with the private key, and confirm that the nonce was signed by the private that correspond to the public key that belongs to the TPM. In this manner, the entity may prove that responding device is indeed the device and/or TPM that it purports to be.

Figure 9:
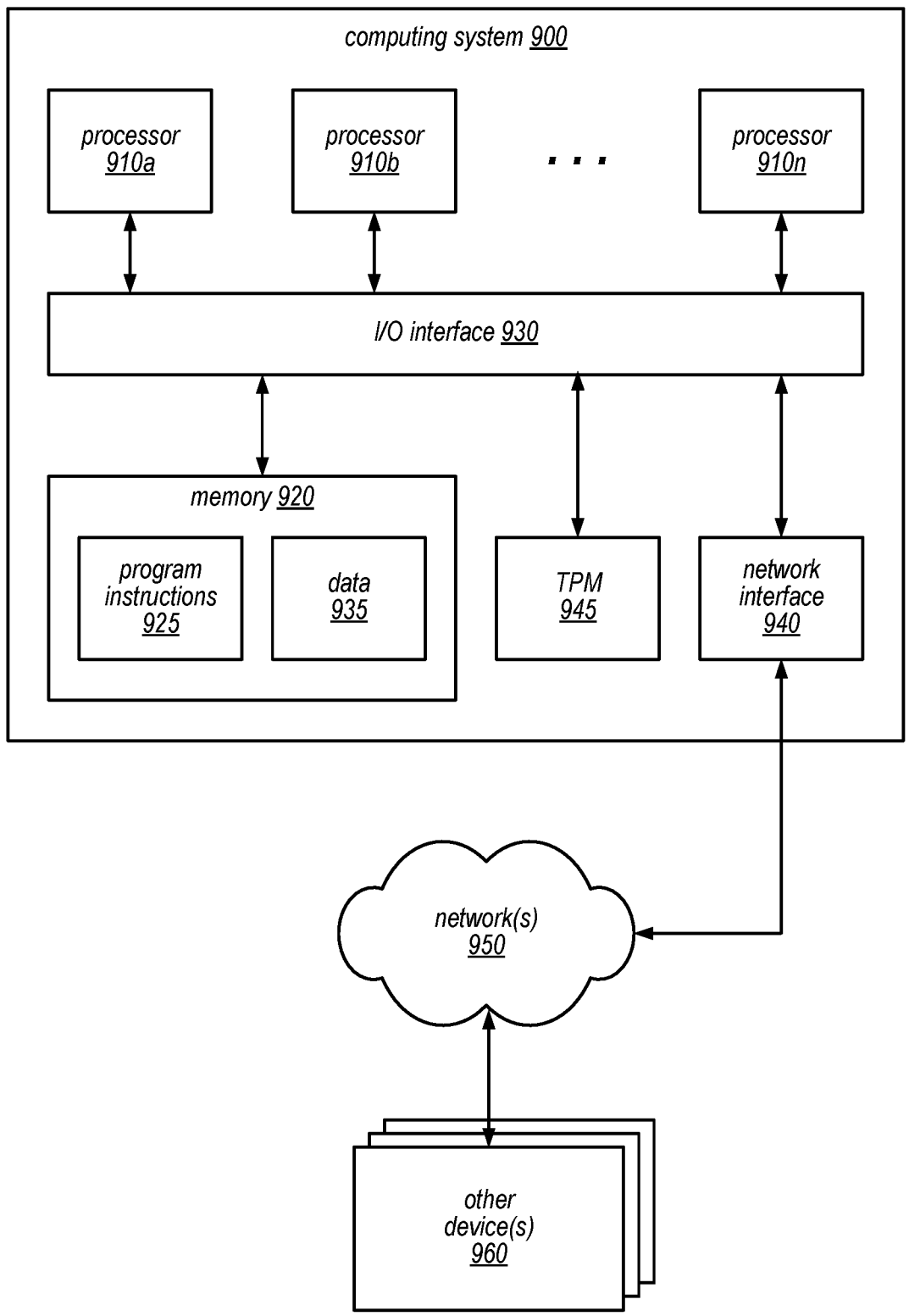
FIG. 9 is a block diagram illustrating an example computer system that can be used to generate and store a persistent identifier and key pair that is tied to a TPM, according to some embodiments.

FIG. 9 is a block diagram illustrating an example computer system that can be used to generate and store a persistent identifier and key pair that is tied to a TPM, according to some embodiments. Computer system 900 may include or be configured to access one or more nonvolatile computer-accessible media. In the illustrated embodiment, computer system 900 includes one or more processors 910 coupled to a system memory 920 via an input/output (I/O) interface 930. Computer system 900 further includes a network interface 940 coupled to I/O interface 930.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x96, PowerPC, SPARC, or MIPS ISAs, or any other suitable ISA. In multiprocessor systems, each of processors 910 may commonly, but not necessarily, implement the same ISA.

System memory 920 may be configured to store instructions and data accessible by processor(s) 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 920 as code 925 and data 935.

In one embodiment, I/O interface 930 may be configured to coordinate I/O traffic between processor 910, system memory 920, and any peripheral devices in the device, including a TPM 945, a network interface 940, or other peripheral interfaces. The TPM 945 may be, for example, TPM 110 as discussed in connection with FIG. 1. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices 960 attached to a network or networks 950, such as other computer systems or devices, such as routers and other computing devices, as illustrated in FIGS. 1 through 8, for example. In various embodiments, network interface 940 may support communication via any suitable wired or wireless general data networks, such as types of Ethernet network, for example. Additionally, network interface 940 may support communication via telecommunications/telephony networks such as analog voice networks or digital fiber communications networks, via storage area networks such as Fibre Channel SANs, or via any other suitable type of network and/or protocol.

In some embodiments, system memory 920 may be one embodiment of a computer-accessible medium configured to store program instructions and data as described above for FIGS. 1 through 8 for implementing embodiments of methods and apparatus for traffic analysis. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 900 via I/O interface 930. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A device, comprising:
    a trusted platform module (TPM) for providing security services for the device; and
    a non-volatile storage containing program instructions that when executed on one or more processors, cause the one or more processors to:
        securely obtain an entropy value generated by the TPM;
        generate a data item based at least in part on the entropy value;
        permanently and securely store the data item in the TPM, wherein the data item is stored so that it cannot be subsequently modified or erased during the TPM's operating lifetime; and
        attest the device's identity based at least in part on the data item.

2. The device of claim 1, wherein the TPM includes a non-volatile memory, the data item comprises a persistent identifier and a persistent key pair, and to permanently and securely store the data item, the device is configured to:
    define a first location in the non-volatile memory to store the persistent identifier, wherein the defining of the first location comprises setting a first define bit for the first location, writing the persistent identifier to first location, and writing a zero byte to the first location to cause the first location to become immutable;
    define a second location in the non-volatile memory to store a public key of the persistent key pair, wherein the defining of the second location comprises setting a second define bit for the second location, writing the public key to second location, and writing a zero byte to the second location to cause the second location to become immutable;
    define a third location in the non-volatile memory to store a private key of the persistent key pair, wherein the defining of the third location comprises setting a third define bit for the third location, writing the private key to third location, and writing a zero byte to the third location to cause the third location to become immutable; and
    update a lock setting of the non-volatile memory to lock contents of the first, second, and third locations.

3. The device of claim 2, wherein the program instructions when executed on the one or more processors cause the one or more processors to:
    configure the TPM to require an assertion of physical presence before providing the private key from the third location; and
    configure the TPM to disable assertions of physical presence subsequent to the permanent and securing storing of the private key.

4. The device of claim 1, wherein the permanent and secure storing of the data item is performed as a one-time process performed after the device takes ownership of the TPM.

5. The system of claim 1, wherein to attest the device's identity, the program instructions when executed on the one or more processors cause the one or more processors to:
    obtain from the TPM a TPM quote containing the data item, wherein the TPM quote is signed using an attestation identity key (AIK) of the TPM.

6. A method comprising:
    performing, by a device having a trusted platform module (TPM), an initialization process on the TPM comprising:
        securely obtaining an entropy value from the TPM;
        generating a data item based at least in part on the entropy value;
        permanently and securely storing the data item in the TPM, wherein the data item is stored so that it cannot be subsequently modified or erased during the TPM's operating lifetime; and
    subsequent to the initialization process, attesting the device's identity based at least in part on the data item.

7. The method of claim 6, wherein the TPM includes a non-volatile storage, the data item comprises a persistent identifier and persistent key pair, and permanently and securely storing the data item comprises:
    defining a first location in the non-volatile storage to store the persistent identifier, wherein the defining of the first location comprises setting a first define bit for the first location, writing the persistent identifier to first location, and writing a zero byte to the first location to cause the first location to become immutable;
    defining a second location in the non-volatile storage to store a public key of the persistent key pair, wherein the defining of the second location comprises setting a second define bit for the second location, writing the public key to second location, and writing a zero byte to the second location to cause the second location to become immutable;

defining a third location in the non-volatile storage to store a private key of the persistent key pair, wherein the defining of the third location comprises setting a third define bit for the third location, writing the private key to third location, and writing a zero byte to the third location to cause the third location to become immutable; and updating a lock setting of the non-volatile storage to lock contents of the first, second, and third locations.

8. The method of claim 7, further comprising:
configuring the TPM to require an assertion of physical presence before providing the private key from the third location; and
configuring the TPM to disable assertions of physical presence subsequent to the initialization process.

9. The method of claim 6, further comprising:
generating an attestation identity key (AIK) for the TPM;
certifying the AIK with an attestation certificate authority (ACA); and
wherein attesting the device's identity comprises generating a TPM quote containing the data item, the TPM quote signed using the AIK.

10. The method of claim 9, wherein certifying the AIK with the ACA is performed using a direct anonymous attestation (DAA) protocol or a privacy certificate authority protocol.

11. The method of claim 10, further comprising:
enrolling the persistent identifier and the public key with the ACA.

12. The method of claim 11, further comprising:
receiving a request sent by another entity to verify the device's identity, wherein the request includes a nonce; and
returning to the other entity the nonce signed using the private key.

13. The method of claim 12, wherein the other entity is a control plane system, and further comprising:
performing, by the control plane system:
receiving the signed nonce generated by the TPM;
obtaining the public key of the persistent key pair;
verifying the identity of the device based at least in part on the signed nonce and the public key; and
in response to the verification, granting a permission to perform an operation using the device.

14. The method of claim 6, wherein the initialization process of the TPM is performed as a one-time process after the device takes ownership of the TPM.

15. The method of claim 6, wherein the initialization process of the TPM is performed as a one-time process after a secure boot sequence of the device.

16. A non-transitory computer-accessible storage medium storing program instructions, wherein the program instructions when executed on one or more processors of a device having a trusted platform module (TPM), cause the device to:
securely obtain an entropy value from the TPM;
generate a data item based at least in part on the pseudo-random value;
permanently and securely store the data item in the TPM, wherein the data item is stored so that it cannot be subsequently modified or erased during the TPM's operating lifetime; and
attest the device's identity based at least in part on the data item.

17. The non-transitory computer-accessible storage medium of claim 16, wherein the TPM includes a non-volatile storage, the data item comprises a persistent identifier and a persistent key pair, and to permanently and securely store the data item, the program instructions when executed on the one or more processors cause the device to:
define a first location in the non-volatile storage to store the persistent identifier, wherein the defining of the first location comprises setting a first define bit for the first location, writing the persistent identifier to first location, and writing a zero byte to the first location to cause the first location to become immutable;
define a second location in the non-volatile storage to store a public key of the persistent key pair, wherein the defining of the second location comprises setting a second define bit for the second location, writing the public key to second location, and writing a zero byte to the second location to cause the second location to become immutable;
define a third location in the non-volatile storage to store a private key of the persistent key pair, wherein the defining of the third location comprises setting a third define bit for the third location, writing the private key to third location, and writing a zero byte to the third location to cause the third location to become immutable; and
update a lock setting of the non-volatile storage to lock contents of the first, second, and third locations.

18. The non-transitory computer-accessible storage medium of claim 17, wherein the program instructions when executed on the one or more processors cause the device to:
configure the TPM to require an assertion of physical presence before providing the private key from the third location; and
configure the TPM to disable assertions of physical presence subsequent to the initialization process.

19. The non-transitory computer-accessible storage medium of claim 17, wherein the program instructions when executed on the one or more processors cause the device to:
generate an attestation identity key (AIK) for the TPM;
certify the AIK with an attestation certificate authority (ACA); and
wherein to attest the device's identity, the program instructions when executed on the one or more processors cause the device to generate a TPM quote containing the data item, the TPM quote signed using the AIK.

20. The non-transitory computer-accessible storage medium of claim 19, wherein the program instructions when executed on the one or more processors cause the device to:
enroll the persistent identifier and the public key with the ACA;
receive a request from another entity to verify the device's identity, the request including a nonce;
obtain a signed nonce from the TPM, signed using the private key of the persistent key pair; and
send the signed nonce to the other entity.

* * * * *